United States Patent [19]

Bishop et al.

[11] 4,077,835

[45] Mar. 7, 1978

[54] NUCLEAR REACTOR WITH SELF-ORIFICING RADIAL BLANKET

[75] Inventors: Alfred A. Bishop, Pittsburgh; Ernst H. G. Weiss, Murrysville; Fred C. Engel, Pittsburgh, all of Pa.

[73] Assignee: Westinghouse Electric Corporation, Pittsburgh, Pa.

[21] Appl. No.: 572,692

[22] Filed: Apr. 29, 1975

Related U.S. Application Data

[63] Continuation of Ser. No. 310,070, Nov. 24, 1972, abandoned, which is a continuation of Ser. No. 53,966, Jul. 10, 1970.

[51] Int. Cl.² ............................................. G21C 15/04
[52] U.S. Cl. ........................................ 176/18; 176/40; 176/61; 176/78
[58] Field of Search ..................... 176/17, 18, 40, 61, 176/87, 78, 64, 54, 59

[56] References Cited

U.S. PATENT DOCUMENTS

| | | | |
|---|---|---|---|
| 3,011,962 | 12/1961 | Koch et al. | 176/17 |
| 3,103,475 | 9/1963 | Szilard | 176/18 |
| 3,379,619 | 4/1968 | Andrews et al. | 176/61 |
| 3,486,973 | 12/1969 | Georges et al. | 176/18 |
| 3,549,493 | 12/1970 | Germer | 176/18 |
| 3,607,637 | 9/1971 | Marshall | 176/61 |
| 3,658,643 | 4/1972 | Spenke | 176/17 |
| 3,658,645 | 4/1972 | Hooper | 176/61 |

*Primary Examiner*—Harvey E. Behrend
*Attorney, Agent, or Firm*—J. R. Campbell; Z. L. Dermer

[57] ABSTRACT

The peripheral blanket of a breeder reactor requires a coolant flow rate which is a varying fraction of that of the central core region. A self-orificing blanket cooling structure which is characterized by a predominance of radial coolant flow, generated by the pressure difference across the blanket, is utilized to supply the necessary cooling. The blanket fuel assemblies are surrounded by perforated cans to allow for radial cross-flow through the blanket region.

3 Claims, 2 Drawing Figures

WITNESSES

INVENTORS
Alfred A. Bishop, Ernst H. G. Weiss
Fred C. Engel

ATTORNEY

NUCLEAR REACTOR WITH SELF-ORIFICING RADIAL BLANKET

This is a CONTINUATION of application Ser. No. 310,070 filed Nov. 24, 1972 now abandoned which is a continuation of application Ser. No. 53966 filed July 10, 1970.

BACKGROUND OF THE INVENTION

This invention pertains to breeder reactors and more particularly to breeder reactors having an orificing system flow coupled with the breeder region of same.

Breeder reactors, and more particularly fast breeder reactors, use fuel bearing radial blankets surrounding the core, for generating new fuel. The so-called breeder region (i.e., the blanket) is characterized by a predominance of fertile as opposed to fissile fuel at the beginning of core life. The energy liberated as heat in the blanket is a small varying fraction of that generated in the fissile core. Thus, the required rate of coolant flow through the radial blanket assemblies is only a fraction of that needed for cooling the core adequately.

Certain breeder reactors dealt with the differential heat production in the fertile versus the fissile region of the nuclear reactor by providing a completely separate coolant inlet structure for the breeder region. Other solutions to this problem relied upon sizing the inlet or outlet orifices in the breeder region so as to allow only a small amount of flow into the breeder region. The breeder region was generally surrounded by heavy annular walls to prevent cross-flow of coolant in the breeder region with the coolant flow in the fissile core. Still other schemes used variable outlet orifices on the breeder region so that the amount of flow therethrough could be varied and generally maintained at a small fraction of that proceeding through the fissile core of the nuclear reactor.

The above coolant flow distribution schemes also generally included canned fuel assemblies, that is, fuel assemblies which were surrounded by a relatively heavy shroud or can, so as to form discrete coolant flow channels. Such channels are generally necessary to make an orificed annular blanket region scheme operate properly.

The above-mentioned solutions generally produce a high pressure and temperature gradient across the blanket and especially at the interface of the blanket with the power producing core. The steep gradients at the interface has necessitated the use of a heavy wall structure to separate the blanket from the core. This structure was expensive, difficult to fabricate and acted to reduce the number of neutrons available for breeding purposes. Moreover the fuel assemblies themselves were surrounded by expensive and difficult to fabricate cans and generally necessitated complicated nozzle structures to properly distribute the flow therethrough.

SUMMARY OF THE INVENTION

This invention proposes to reduce blanket assembly cost and to minimize the large radial pressure and temperature differences between the core and the blanket by utilizing a self-orificing concept for the radial blanket region of a breeder reactor. Self-orificing is achieved by employing perforated cans for the blanket fuel assemblies and hydrodynamically diverting flow from the core or elsewhere to the radial blanket as required by the temperature distribution therein.

The fuel bearing region of a nuclear reactor includes both fissile and fertile fuel assemblies. These fuel assemblies are generally held between an upper core plate and a lower core plate and surrounded by a generally annular wall formed by reflector fuel assemblies constructed of a non-fissile or fertile material which have the property of reflecting neutrons. The reflector assemblies generally form a large central flow channel therebetween through which substantially all the fluid entering the reactor passes through the fuel bearing region. The upper and lower core plates are formed with a plurality of openings for the entry into and exit of coolant flow from the fuel bearing region of the reactor. In most reactors, the coolant flow proceeds axially through the entire fuel bearing region. In accordance with this invention the predominant amount of coolant flows axially through the fissile power producing core of the reactor and orifices are provided in the core plates above and below this region to produce such a flow pattern. However, the concept of self-orificing implies a hydrodynamic diversion of some of this axial flow to cause radial flow through the fertile blanket region.

In one embodiment of the invention, the radial blanket and core are nearly at the same pressure at corresponding elevations. The small pressure gradient which exists makes sufficient coolant flow outwardly near the bottom or inlet of the power producing core region, and a reverse gradient which exists at the top return this flow to the main core coolant stream. The resistance along the flow path determines the coolant rate to the radial or blanket assemblies. Since the pressure drop increases along the flow path through successive radial blanket assemblies, the outer assemblies receive less flow than the ones which are adjacent to the core. This flow pattern is proportional to the heat generation distribution in the blanket region. The greatest cooling action is required at the turbulent passage of the coolant through the first ring of perforated blanket assemblies and this coincides with the flux peak in the radial blanket.

In another embodiment of this invention, coolant flow is diverted from an annulus provided exterior to the blanket assemblies. The flow pattern is thus from the annulus, radially across the blanket assemblies, and into the power producing core region. The flow diverted from the annulus then mixes with the coolant flow proceeding axially through the core.

DESCRIPTION OF THE DRAWINGS

For a better understanding of the invention, reference may be had to the accompanying drawings which show exemplary embodiments of the invention, and in which.

DESCRIPTION OF THE PREFERRED EMBODIMENTS

Figure 1:
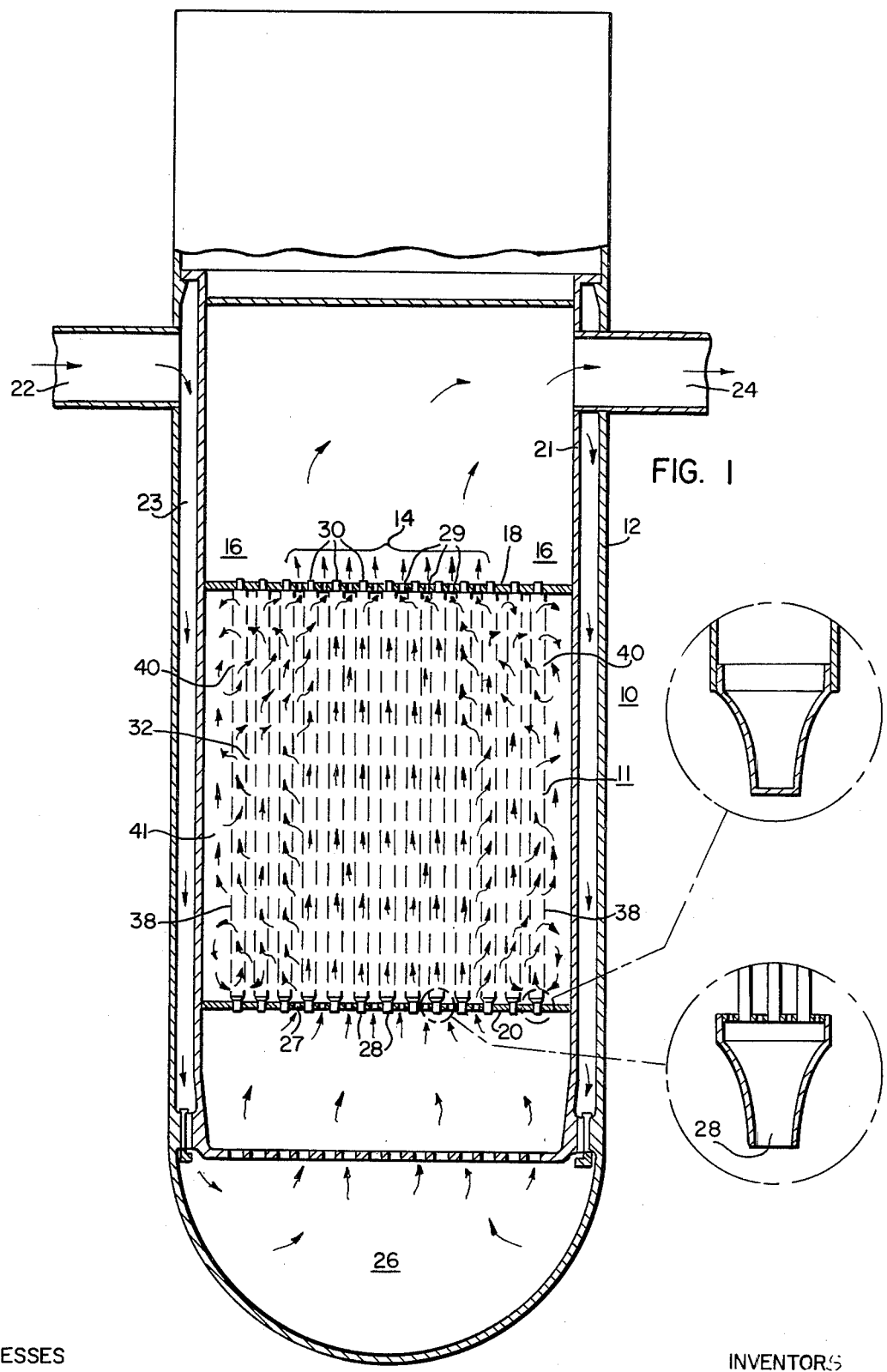
FIG. 1 is a schematic elevational view of a reactor showing one embodiment of the invention.

Referring to FIG. 1 there is shown a nuclear reactor 10 generally of the design described in detail in a copending application Ser. No. 630,007, filed Apr. 11, 1967 by Nicholas J. Georges and Fred C. Engel, and entitled "Breeder Reactor". In the schematic representation of FIG. 1, a pressure vessel 12 is shown which includes a nuclear fuel bearing region 11 consisting of a plurality of fuel assemblies (shown schematically). The fuel bearing region 11 includes two regions; a power producing core region 14 and a generally annular peripheral blanket or breeding region 16. The power producing core region has fuel assemblies containing primarily fissile material whereas the blanket region 16 is constructed of fuel assemblies containing primarily fertile material; as is well known in the art. The regions are shown to be included between an upper core plate 18 and a lower core plate 20. The upper and lower core plates, 18 and 20, are supported by a core-barrel 21 which is supportedly suspended within the vessel 12. The vessel 12 has coolant flow inlet openings 22 and an outlet openings 24.

Coolant flow, as for example liquid sodium, enters the vessel 12 through inlet opening 22 and proceeds to a lower coolant manifold 26 through an inlet annulus 23 formed by and between the vessel 12 and the core-barrel 21. Coolant flow proceeds from the lower coolant manifold 26 into the power producing core in an axial direction by way of orifices 28 which allows coolant to enter the fuel assemblies through nozzles therein and additional orifices 27 between fuel assemblies. The orifices 27 and 28 in the lower core plate 20 are only provided directly beneath the power producing core 14. Similarly orifices 29 and 30 are provided for the exit of the coolant fluid from the nuclear core, and the orifices 29 and 30 are only provided directly above the power producing core 14 with the orifices 29 flow-coupled with those assemblies with which orifices 27 are associated.

As is known in the art, the fuel assemblies which comprise the power producing core 14 consist of a plurality of fuel rods (not shown) containing fissile material and held together in a suitable structure including "egg-crate" like grid structures which enables them to be inserted into and removed from the core as a single entity. The fuel assembly of the core are of the canless type, so called because the fuel rods are not surrounded by a can or shroud. A plurality of coolant flow channels exist between the fuel elements and the fuel assemblies. In contrast, the fuel assemblies which make up the blanket are constructed of a plurality of fuel elements containing fertile material restrained in a suitable structure and surrounded by a perforated can. Schematically, a plurality of holes 32 are shown in FIG. 1 which represent from a hydraulic viewpoint the perforations in the cans of the fuel assemblies of the breeder region 16.

Since orifices, such as 27, 28, 29 and 30, are not provided above and below the blanket region 16, a differential pressure exists between the power producing core 14 and the blanket region 16 which causes the generally axially proceeding coolant flow that cools the power producing core region 14 to be diverted in a generally radial direction so as to cool the blanket region 16. It is this hydrodynamic phenomenon which has been previously referred to as self-orificing. The arrows in FIG. 1 show the general coolant flow pattern throughout the fuel bearing region of the reactor 10.

A small radial pressure gradient makes sufficient coolant flow outward near the bottom or inlet to cool the blanket and a reverse gradient returns this flow to the main core coolant stream near the top or outlet. The resistance of the flow path determines the coolant rate to the blanket assemblies 16. Since the pressure drop increases with flow through successive radial blanket assemblies, the outer assemblies receive less flow than the one adjacent the core. The flow pattern is particularly efficient since such a flow distribution is just proportional to the heat generation distribution.

It is possible that dependent upon the fuel density in a particular breeder reactor that flow orifices, such as 28 and 30, might be provided in cooperation with the blanket region 16. A fewer number of such orifices would be necessary than would be desirable with the power producing core region 14. However, the predominant amount of cooling in the blanket region 16 would still be achieved by a radial diversion of the axial flow which is provided to cool the power producing core region 14.

As should be apparent once having provided a flow path for a self-induced flow distribution which is proportional to the heat generation within the nuclear core, one need not be concerned about great pressure and temperature distribution differences across the core. Accordingly such problems as fabrication of the assembly cans to take a high stress loading and thermal shock are no longer of concern. The net effect is that the core is self-regulating to a degree and thus can be constructed of assemblies in a configuration of relatively low cost.

Figure 2:
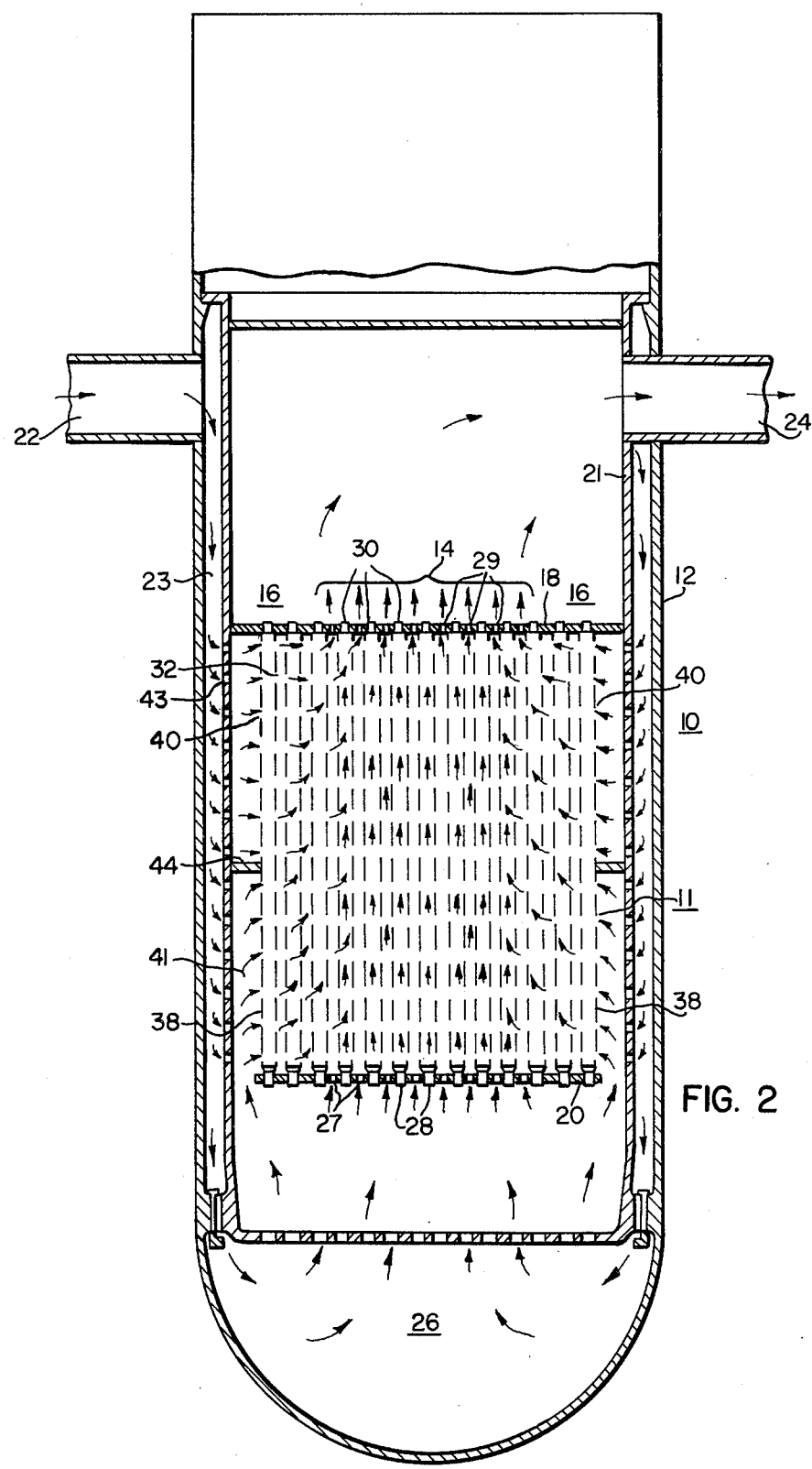
FIG. 2 shows another embodiment of the invention.

FIG. 2 shows another embodiment in which self-orificing can be achieved. In FIG. 2 the numerals are referenced to the structure of FIG. 1. In this embodiment, a generally annular retaining wall 38 for the fuel bearing region 11 is provided with a plurality of orifices 40 through which coolant fluid which has been permitted ingress into an annulus 41, formed by and between the core-barrel 21 and the retaining wall 38, can proceed into the blanket region 16. Some of the fluid which enters annulus 41 can be conveniently diverted from the inlet annulus 23 through holes 43 provided for this purpose. The annulus 41 includes a divider ring 44 so located that the flow which proceeds up the annulus 41 and through the holes 43 produces a cross-flow in the bottom half of the blanket fuel assemblies, and the flow which is received in the annulus 41 solely through the holes 43 produces a cross-flow across the top of the radial blanket assembly 16.

In this embodiment the use of perforated cans including holes 32 for the fuel assemblies of the blanket region 16 in cooperation with an orificing system which blocks axial admission of coolant to the radial blanket region 16 produces a cross-flow which proceeds inwardly in a radial direction until it mixes with the axial flow proceeding through the power producing core 14. Proper sizing of the holes 40 and the inlets to the annulus 38 can produce a radial cross flow which is a proper predetermined fraction of that proceeding through the core region.

What is claimed is:
1. A nuclear reactor comprising:
a closed pressure vessel having a coolant flow inlet and outlet;
a core barrel supporting a reactor core in said vessel;
means spacing the core barrel from the pressure vessel to provide an annulus for the flow of coolant from the inlet to the bottom of said core;
said core comprising upper and lower core plates supporting a plurality of nuclear fuel assemblies therebetween;
a first portion of said assemblies containing primary fissile fuel located in a power producing central region of said core;
a second portion of said assemblies containing primary fertile fuel positioned in a breeder blanket region surrounding said first assemblies;

coolant flow openings in the lower and upper core plates co-extensive only with the central region of said core which together with said central region fuel assemblies permit coolant to flow into the core then axially upward through said central region of the core prior to discharge out said outlet;

means enclosing each of said blanket region fuel assemblies in a can which imparts structural support thereto, and perforations in each can which allow coolant from the central region to flow therethrough to cool the blanket fuel assemblies;

said central region assemblies being constructed and arranged to permit axial flow through the central region assemblies and radial flow outwardly thereof, and then upwardly thereof through the blanket assemblies, such construction imparting resistance to coolant flow through the central region assemblies, such resistance causing a radial pressure gradient near the bottom of said blanket assemblies and a reverse radial pressure gradient near the top of said blanket assemblies which acts to cause a portion of said axial flowing coolant to be directed radially outward into the bottom of said blanket assemblies prior to flow upwardly therethrough for cooling the same before returning near the top of said blanket assemblies to join said coolant flowing axially through said central region of the core.

2. The reactor of claim 1 wherein said openings in the lower core plate are positioned in alignment with said central region assemblies, and a nozzle in each central region assembly projecting into each lower core plate opening for directing coolant into the central region assemblies; and other openings located between said nozzle filled openings to permit flow of coolant upwardly around said central region fuel assemblies.

3. The reactor according to claim 1 wherein each of said blanket fuel assemblies include a nozzle projecting into said lower core plate for imparting support thereto, each of said nozzles being closed at their entrance end to preclude the flow of coolant therethrough into the blanket assemblies.

* * * * *